United States Patent [19]

Kuwahara et al.

[11] Patent Number: 5,262,774
[45] Date of Patent: Nov. 16, 1993

[54] ON-VEHICLE NAVIGATION APPARATUS

[75] Inventors: Shingo Kuwahara; Morio Araki, both of Saitama, Japan

[73] Assignee: Pioneer Electronic Corporation, Tokyo, Japan

[21] Appl. No.: 32,209

[22] Filed: Mar. 15, 1993

Related U.S. Application Data

[63] Continuation of Ser. No. 817,631, Jan. 7, 1992, abandoned.

[30] Foreign Application Priority Data

Mar. 18, 1991 [JP] Japan ..................... 3-52543

[51] Int. Cl.⁵ .................... G08G 1/123; G01C 21/00
[52] U.S. Cl. ................................. 340/988; 340/990;
340/995; 364/443; 364/444; 364/449;
364/424.02
[58] Field of Search ............... 340/988, 990, 995;
364/443, 444, 449, 424.02

[56] References Cited

U.S. PATENT DOCUMENTS

| | | | |
|---|---|---|---|
| 4,891,760 | 1/1990 | Kashiwazaki et al. | 340/990 |
| 4,903,211 | 2/1990 | Ando | 340/990 |
| 5,117,363 | 5/1992 | Akiyama et al. | 340/990 |

FOREIGN PATENT DOCUMENTS

| | | |
|---|---|---|
| 0166547 | 1/1986 | European Pat. Off. |
| 2-129797 | 5/1990 | Japan |
| 2302615 | 12/1990 | Japan |
| 3071015 | 3/1991 | Japan |

Primary Examiner—Donnie L. Crosland

[57] ABSTRACT

An on-vehicle navigation apparatus has enhanced efficiency of the use of a memory for storing the locus data, without losing the details and accuracy of a locus pattern drawn on the basis of collected locus data. The on-vehicle navigation apparatus acquires vehicle location information C and time information T, and stores the vehicle location information C as locus data $S_i$ and the associated time information T as collecting time data $T_i$ in response to a collection command. The apparatus then computes a travel distance D from the previous locus data collecting position on the basis of the vehicle location information C and the locus data $S_i$, computes elapsed time $\Delta T$ from the previous locus data collecting time on the basis of the time information T and the collecting time data $T_i$, and generates the collection command when the elapsed time $\Delta T$ reaches a predetermined time after a predetermined travel distance D is reached.

6 Claims, 5 Drawing Sheets

ON-VEHICLE NAVIGATION APPARATUS

This application is a continuation of U.S. application Ser. No. 07/817,631 filed Jan. 7, 1992, now abandoned.

BACKGROUND OF THE INVENTION

1. Field of the Invention

The present invention relates to an on-vehicle navigation apparatus, and more particularly to an on-vehicle navigation apparatus which functions to collect information of the locus of a moving vehicle on the basis of map information and the location of the vehicle, and to display the information on a display device (hereinafter referred to as "display").

2. Description of Background Information

On-vehicle navigation apparatuses are put into practical use, which generally are structured such that map information is stored in a memory, the map information is then read-out from the memory, and displayed together with the current location of a vehicle, thereby guiding the vehicle to a predetermined destination.

In general, display of the travel locus information of the vehicle in which the on-vehicle navigation apparatus is mounted is performed on the basis of the information of current location of the vehicle for every certain travel distance or every certain running time of the vehicle.

Since the travel locus of the vehicle is a collection of discrete positional data, the shorter the interval between discrete positions, the finer the locus pattern drawn by the discrete positions. However, a larger memory capacity will be required to store the positional data. Conversely, the longer the interval between pieces of such positional data, the less amount of the positional data should be stored, thus requiring a smaller memory capacity. However, the locus pattern will become rougher with respect to map information.

With the method of collecting locus data on the basis of positional data, that is, information of the vehicle's location at every predetermined travel distance for displaying the locus data, if the interval of collection of the locus data is set at a short value, unnecessary locus data will have to be stored in a memory also in a monotonous running condition when the vehicle drives on a relatively straight street, such as an expressway. If the interval of collection of the locus data is set at a long value, the locus data will be inaccurate for a map when the vehicle drives through an area that includes intricate roads, such as town roads.

With the method of collecting locus data at every predetermined running time for displaying the locus data, if the time interval of collection of the locus data is set to be short, unnecessary locus data will have to be stored during low-speed driving. If, on the other hand, the time interval is set to be long, the locus data becomes sparse and very dispersed in terms of location, as compared with the actual locus of the moving vehicle will be acquired during high-speed driving. It is not therefore possible to provide a user with accurate locus information.

SUMMARY OF THE INVENTION

It is therefore an object of the present invention to provide an on-vehicle navigation apparatus, which has a high efficiency in using a memory for storing locus data, without losing the details and accuracy of a locus pattern drawn on the basis of collected locus data.

An on-vehicle navigation apparatus according to the present invention is characterized by collection instructing means for generating a collection command when a predetermined time has elapsed after a previous locus data collecting time, after a travel distance from a previous locus data collecting position has reached a predetermined distance value.

An on-vehicle navigation apparatus according to the present invention is characterized by collection instructing means for generating a collection command when the travel distance from a previous locus data collecting position has reached a predetermined distance value, after a time when a predetermined time has elapsed after a previous locus data collecting time.

An on-vehicle navigation apparatus according to the present invention is characterized by storage means for storing collection time data or an elapsed time at a time of generation of a collection command in association with the travel locus data.

An on-vehicle navigation apparatus according to the present invention is characterized by means for incrementing a traffic jam index when a predetermined travel distance is not reached from a previous locus data collecting position, after a time when a predetermined time has elapsed after a previous locus data collecting time, and storage means for storing collecting time data or the traffic jam index in association with the travel locus data.

The on-vehicle navigation apparatus according to the present invention functions to collect locus data on the basis of the information of current location of a vehicle when a predetermined time has elapsed after a predetermined distance or longer is covered from the previous locus data collecting position.

The on-vehicle navigation apparatus according to the present invention collects locus data on the basis of information of the current position of a vehicle when the vhicle has traveled a predetermined distance after a predetermined time has elapsed from a time of the previous locus data collecting time and position.

The on-vehicle navigation apparatus according to the present invention stores, into a memory, a collecting time or a time period elapsed from the previous locus data collecting time to a current locus data collecting time, together with travel locus data.

The on-vehicle navigation apparatus according to the present invention stores, into a memory, a collecting time or a traffic jam index from the previous locus data collecting time to a current locus data collecting time, together with locus data.

DETAILED DESCRIPTION OF THE PREFERRED EMBODIMENTS

Figure 1:
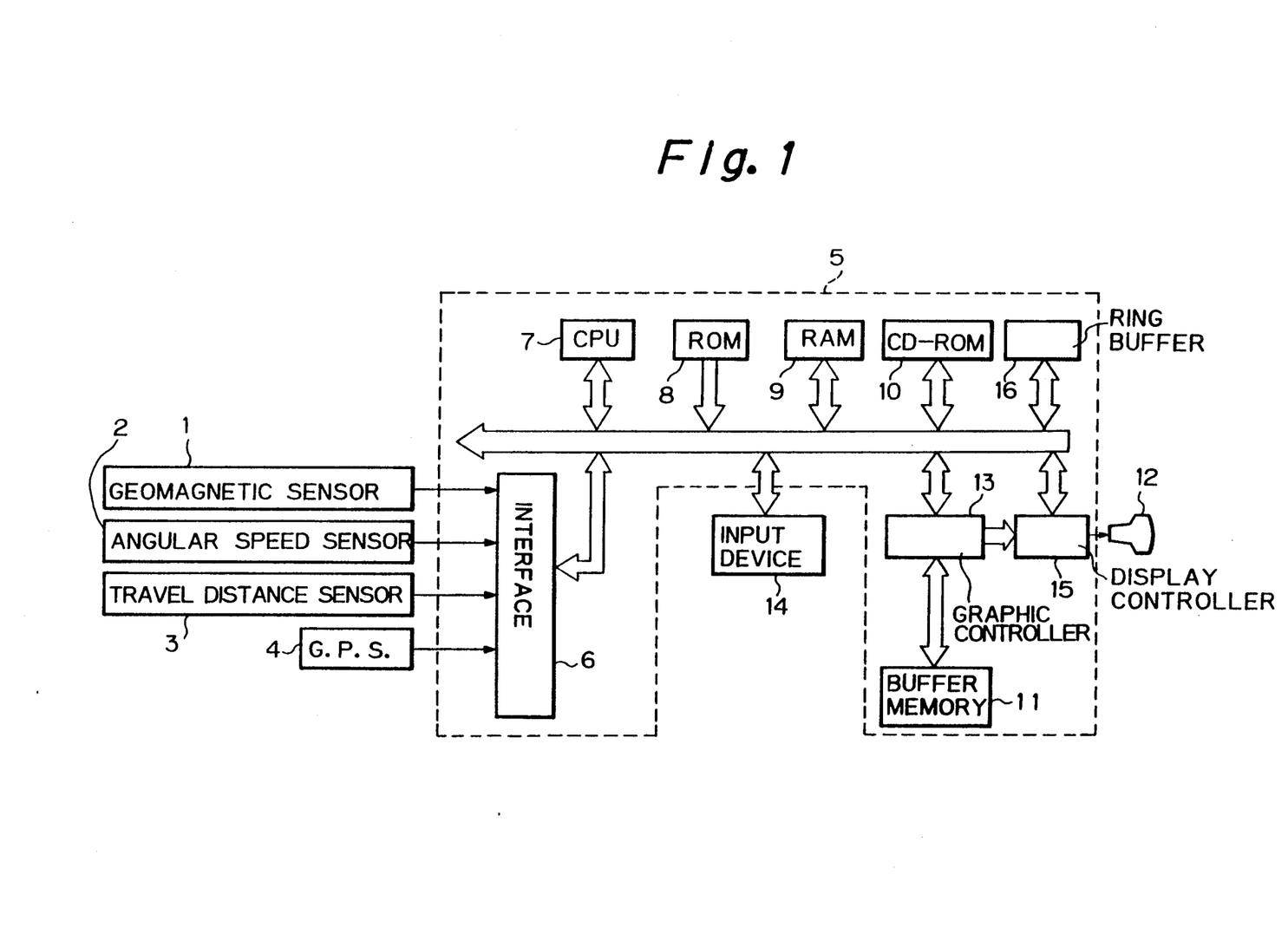
FIG. 1 is a block diagram illustrating the structure of an on-vehicle navigation apparatus embodying the present invention.

FIG. 1 illustrates an example of an on-vehicle navigation apparatus where the present invention is embodied.

Preferred embodiments of the present invention will now be described in detail referring to FIG. 1.

A geomagnetic sensor 1 outputs direction data of a vehicle on the basis of geomagnetism (geomagnetic field). An angular speed sensor 2 detects an angular speed of the vehicle. A travel distance sensor 3 detects the traveling distance of the vehicle. A GPS (Global Positioning System) device 4 detects the current location of the vehicle in accordance with latitude and longitude information. Output signals from these sensors and device are supplied to a system controller 5.

The system controller 5 comprises an interface 6, a CPU (Central Processing Unit) 7, a ROM (Read Only Memory) 8, a RAM (Random Access Memory) 9, a recording medium 10, a buffer memory 11, a graphic controller 13 and a display controller 15. The interface 6 receives outputs from the sensors 1 to 3 and GPS device 4 to perform functions including analog-to-digital conversion. The CPU 7 executes various image data processes, and computes the amount of movement and current position of the vehicle on the basis of the data from the sensors 1 to 3 and GPS device 4 which are sequentially sent through the interface 6. In the ROM 8, various processing programs for the CPU 7 and other necessary information are previously stored. The RAM 9 is accessed so that information necessary for executing the programs is written thereinto or read out therefrom. The recording medium 10 constituted of a so-called CD-ROM or IC card, has digitized map information recorded thereon. The buffer memory 11, constituted of a V-RAM (Video RAM) or the like, temporarily stores image information to be immediately displayed, as a frame buffer. The graphic controller 13 writes data, such as map information, sent in response to a command from the CPU 7, into the buffer memory 11 and outputs the data as image information. The display controller 15 controls a liquid crystal display or a display 12, such as a CRT, in accordance with the image information sent from the graphic controller 13. An input device 14, constituted by a keyboard or the like, sends various commands to the system controller 5 when a user operates keys. A ring buffer 16 is a static type memory which can always hold recorded data by the power from an exclusive internal battery, even when a power switch for the entire system is turned off. The ring buffer 16 stores locus data.

Figure 2:
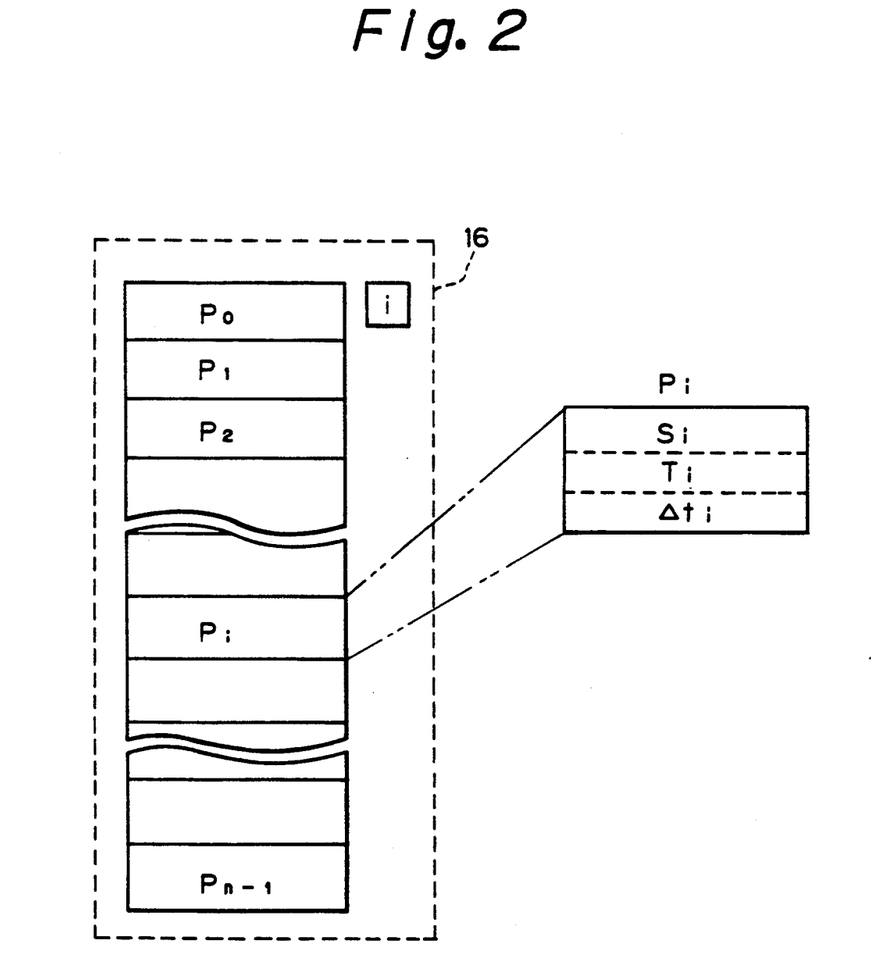
FIG. 2 is a diagram for explaining a ring buffer which stores locus data.
Figure 3:
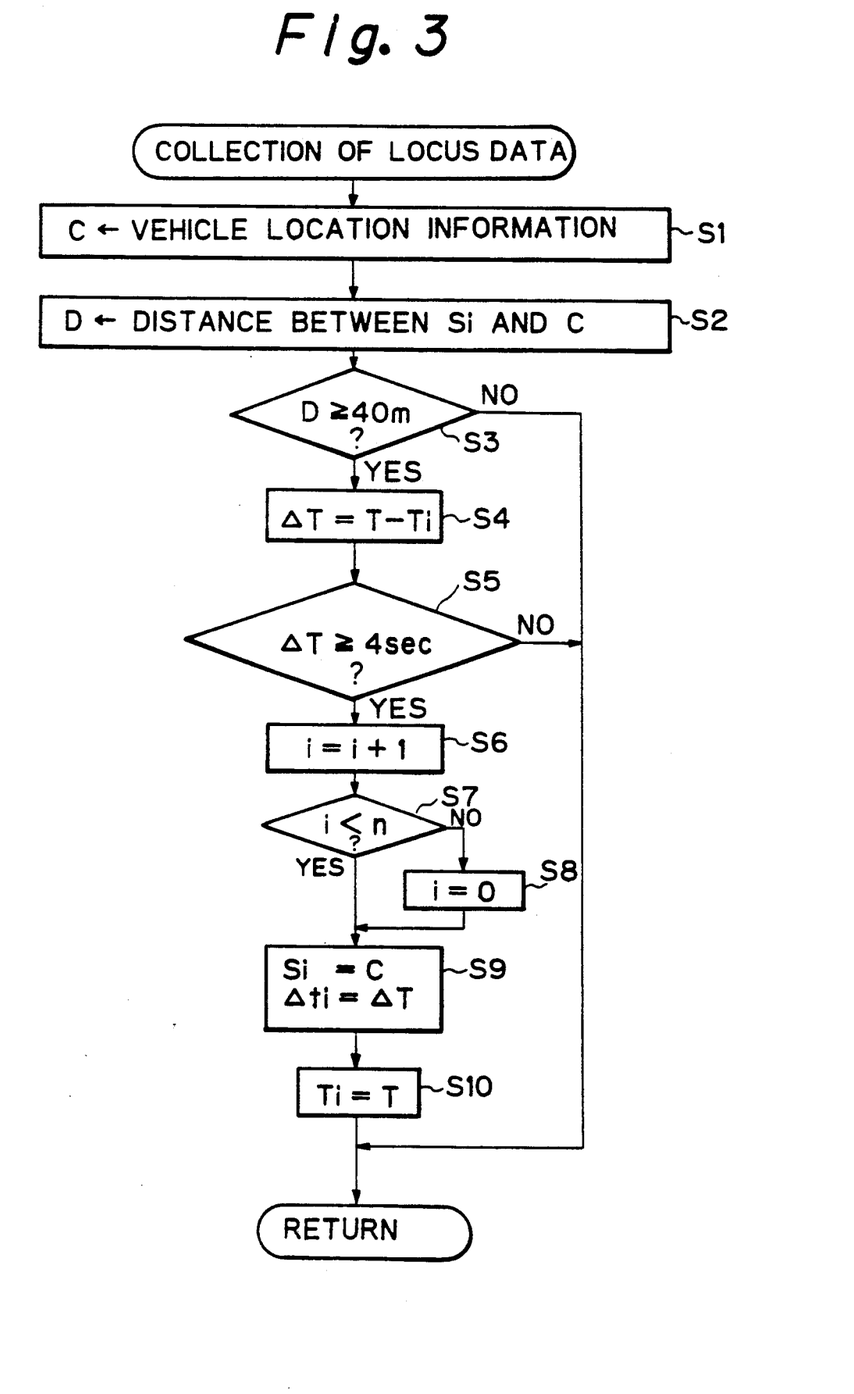
FIG. 3 is a flowchart for explaining procedures for collecting the locus data according to a first embodiment of the present invention.

FIG. 2 shows a so-called memory map of the ring buffer 16 as an example of a storage medium for storing locus data of a vehicle (hereafter referred to as simply "locus data"). FIG. 3 is a flowchart showing the procedures which the CPU 7 executes to collect the data locus in cooperation with the ring buffer 16. A first embodiment will now be explained referring to FIGS. 2 and 3.

In FIG. 2, the ring buffer 16 includes packets P0 to Pn-1 each as a predetermined data block. "n" means the number of packets that can be stored in the ring buffer 16. A specific packet among the packets Pi (i=0, 1, ...,n-1) is designated by a packet number i, and predetermined packet data for that designated packet is written in or read out from the ring buffer 16. The packet number i is a pointer which directs the last packet to be written into or to be read from the ring buffer 16. When writing or reading of new data is requested and the packet number i indexes the last packet in the ring buffer 16, the packet number i is shifted to index the first packet. If otherwise, the packet number i is incremented to indicate the next packet.

The packet Pi secures a memory area for storing locus data, i.e., longitude/latitude data Si representing collecting points on the map, as well as data $\Delta t_i$ of the elapsed time between the previous locus data collecting time and the current locus data collecting time, and time Ti for collecting the locus data. The longitude/latitude data Si and the elapsed time data $\Delta t_i$ among the packet data to be stored in one packet serve as one piece of locus information at the timing for collecting the locus data.

In FIG. 3, when the operation moves from a main routine (not shown) to a routine for collecting locus data, the CPU 7 acquires longitude/latitude data C for the location of the vehicle, or the current position by the system (step S1). The CPU 7 computes a travel distance D from the previous locus data collecting position to the current position, on the basis of the received longitude/latitude data C and the aforementioned longitude/latitude data Si in the last write packet Pi (step S2).

The CPU 7 then determines whether the travel distance D has reached a predetermined distance, for example, 40 meters (step S3). If the travel distance D has not reached the predetermined distance, the CPU 7 terminates the subroutine to return to the main routine. This process specifies the minimum distance required to accurately draw the locus of the vehicle on the map. The predetermined distance has to satisfy the specified distance when the vehicle is driving at a low speed.

As the vehicle drives, the subroutine is invoked again from the main routine to perform steps S1 and S2. When the travel distance D has reached 40 meters, the CPU 7 subtracts the previous locus data collecting time Ti in the last write packet Pi from the current time T that the system is holding, providing an elapsed time $\Delta T$ from the previous locus data collecting time to the current time (step S4). The CPU 7 determines whether the elapsed time $\Delta T$ has reached a predetermined time, for example, 4 secconds (step S5). If the time $\Delta T$ has not reached 4 seconds, the CPU 7 terminates the subroutine to return to the main routine. In this manner, the number of pieces of monotonous locus data during high-speed driving condition, i.e., the locus data to be stored in the ring buffer 16 in such a condition will be reduced. When the vehicle is running at a low speed, the predetermined time has only to satisfy a locus data collecting time where the locus of the vehicle can be accurately drawn on the map.

As the running of the vehicle, the subroutine is called again in the main routine to perform the processes in steps S1, S2, S3 and S4. When the elapsed time $\Delta T$ has reached 4 seconds, the CPU 7 issues a locus data collecting command to the ring buffer 16, and increments the packet number i by "1" (step S6). It is determined whether the packet number i is equal to or greater than the number of storable packets n (step S7). If the packet number i is equal to or greater than n, i=0 (step S8). It is to be noted that those steps S6, S7 and S8 are accomplished by the function of the ring buffer 16.

If the packet number i is smaller than the storable number of packets n, the longitude/latitude data C for the current point and the elapsed time $\Delta T$ in steps S1 and S4 are stored in the ring buffer 16, respectively as longitude/latitude data Si in the selected packet Pi and the data Δti of the time having elapsed from the previous locus data collecting 25 time (step S9). As the longitude/latitude data Si and the elapsed time data Δti are stored in one packet specified by the packet number i in this manner, one piece of locus data is collected.

The current time T is stored as the current locus data collecting time data Ti in the specified packet Pi, together with the elapsed time data Δti (step S10). This ends the subroutine.

In this embodiment as described above, the CPU 7 determines the traveling distance from the previous locus data collecting position to the current position as in step S3, and the locus data is collected only if the travel distance has reached a predetermined distance and the time elapsed from the previous locus data collecting time to the current time has reached a predetermined time. As a result, the ring buffer 16 can avoid storing insignificant locus data during high-speed driving and can hold only valid locus data without losing the accuracy of the locus of the vehicle on the map.

Figure 4:
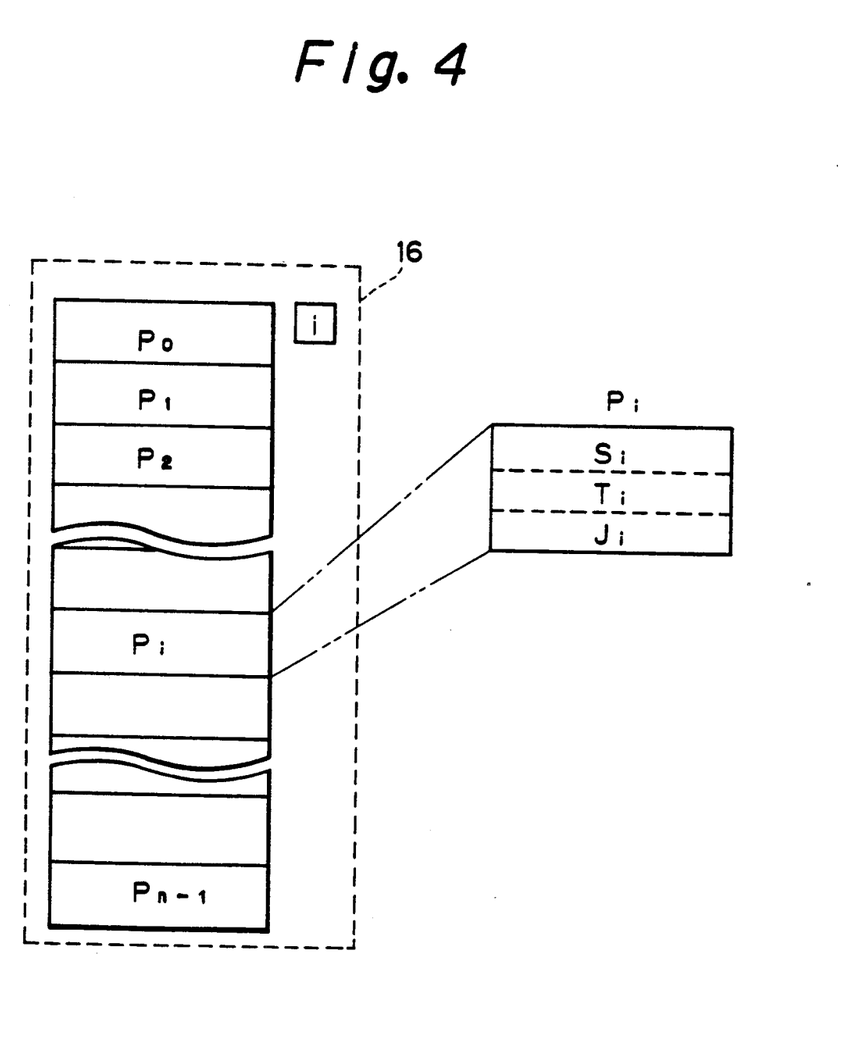
FIG. 4 is a diagram for explaining a ring buffer which stores locus data.
Figure 5:
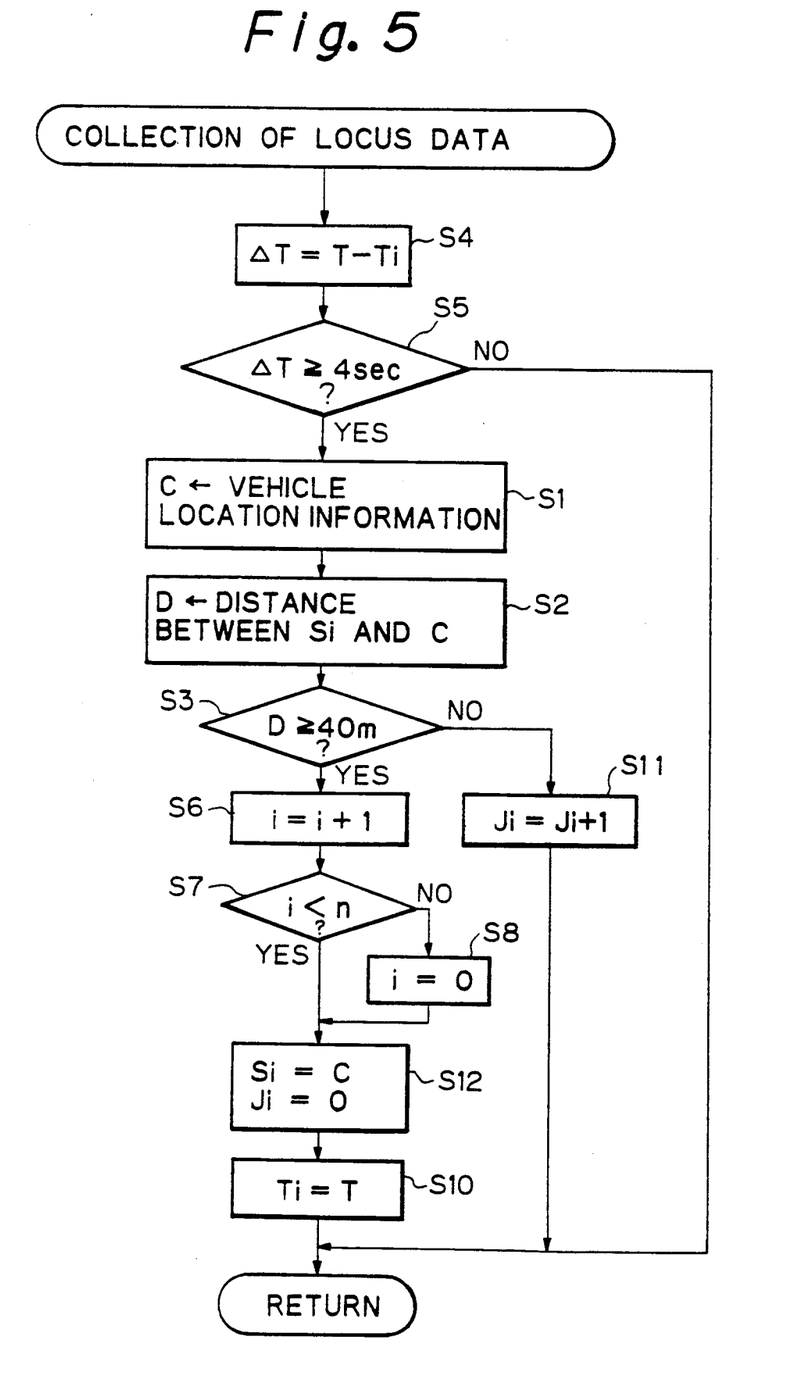
FIG. 5 is a flowchart for explaining procedures for collecting the locus data according to a second embodiment of the present invention.

FIG. 4 shows a so-called memory map of the ring buffer 16 as an example of a storage medium for storing locus data. FIG. 5 is a flowchart showing a sequence of procedures which the CPU 7 executes to collect the locus data in cooperation with the ring buffer 16. A second embodiment will now be described referring to FIGS. 4 and 5.

Like or same reference numerals and drawings as used in FIG. 2 are used in FIG. 4 to denote corresponding or identical elements, and the explanation of these elements will not be repeated. According to this embodiment, the memory area for the elapsed time data Δti in FIG. 2 serves to store a traffic jam index Ji to be described later. The index Ji serves together with the longitude/latitude data Si as locus information.

The same reference numerals or step numbers as used in FIG. 3 are used to indicate corresponding or identical steps in FIG. 5 to avoid their detailed explanation.

First, in step S4 the CPU 7 computes an elapsed time ΔT from the previous locus data collecting time to the current time. The CPU 7 determines in step S5 whether the elapsed time ΔT has reached a predetermined time of 4 seconds. The locus data can be collected at every predetermined time in this embodiment. If the time ΔT has not reached 4 seconds, the CPU 7 terminates the subroutine to return to the main routine.

As the vehicle moves, the subroutine is called again in the main routine to perform the process in step S4. If the elapsed time ΔT has reached 4 seconds, the flow moves to step S1. In steps S1 and S2, the CPU 7 computes the travel distance D from the previous locus data collecting position Si to the current position C. It is then determined in step S3 whether the travel distance D is greater or smaller than a predetermined distance of 40 meters.

If the travel distance D from the previous locus data collecting position Si to the current position C has not reached the predetermined distance of 40 meters, the CPU 7 judges that the vehicle is caught in a traffic jam, and increments the traffic jam index Ji by "1" (step S11). The packet number i at this time is held as it is when the previous locus data is collected. The ring buffer 16 is therefore to be accessed to update only the traffic jam index out of the previously stored packet data. The subroutine is then terminated and the flow returns to the main routine. This process reduces the number of insignificant pieces of locus data during driving at a low speed or in a traffic jam, i.e., the number of pieces of locus data to be stored in the ring buffer 16.

If the travel distance D has not reached the predetermined distance 40 meters in step S3 even though the subroutine has been called several times from the main routine, the traffic jam index Ji associated with the previous locus data is incremented in step S11 each time. In accordance with the traffic jam index Ji, the CPU 7 recognizes how low the speed is or how heavy the traffic jam is.

As the vehicle moves, the subroutine is invoked again from the main routine to perform steps S4, S5, S1, S2 and S3 one after another. If the travel distance D has reached 40 meters, the CPU 7 issues a locus data collecting command to the ring buffer 16. The packet number i is incremented by "1" in step S6. It is determined in step S7 whether the packet number i is greater or smaller than the storable number of packets n. If the packet number i is equal to greater than n, i=0 in step S8.

On the basis of the new packet number i yielded in step S7 or S8, the longitude/latitude data C of the current position acquired in step S1 is treated as the longitude/latitude data Si for the locus data that is to be collected this time, and the traffic jam index data Ji =0 is stored in the packet Pi (step S12). As the longitude/latitude data Si and the traffic jam index data Ji are stored in one packet specified by the packet number i in this manner, collection of one piece of locus data is carried out.

In step S10, the current time T is stored as the current locus data collecting time data Ti in the specified packet Pi, together with the traffic jam index data Ji. This ends the subroutine.

According to this embodiment as described above, the CPU 7 determines the traveling time from the previous locus data collecting time to the current time as in step S5, and the locus data is collected only if the elapsed time has reached a predetermined time and the vehicle has driven a predetermined distance. As a result, it is possible to avoid storing insignificant locus data during low-speed driving or driving through a traffic jam in the ring buffer 16 and store only valid locus data there without losing the accuracy of the locus of the vehicle on the map.

The main routines in both the first and second embodiments have procedures to invoke subroutines for collecting individual pieces of locus data in good time before the predetermined distance of 40 meters is covered and the predetermined time of 4 seconds passes.

According to the first and second embodiments as described above, the current time T in collecting locus data is stored as the time Ti where that locus data is collected, together with longitude/latitude data, in the memory. It is therefore easy to acquire a traveling time between arbitrary locations on the locus of the moving vehicle or the location of the vehicle at any predetermined time from the stored time Ti.

The elapsed time data Δti in the first embodiment and the traffic jam index data Ji in the second embodiment can also provide the traveling time in an arbitrary interval on the locus. Since the traveling time is the sum of time intervals from one point to the next point, multiplication of the elapsed times in an arbitrary interval needs to be performed. The traffic jam index data Ji is also elapsed time information which represents how long it takes for the vehicle to cover a predetermined distance after driving for a predetermined time. The traveling time can therefore be calculated in a similar manner referring to the traffic jam index data Ji.

The foregoing description of the first and second embodiments is given with reference to the case where in collecting the locus data, the collecting time Ti, and the elapsed time Δti or the traffic jam index Ji are stored together with the longitude/latitude data Si into the memory. For the purpose of simply drawing the locus of the moving vehicle on the map without acquiring the traveling time or the location of the vehicle, the elapsed time and the traffic jam index need not be derived.

Further in the embodiments, locus information is stored in a ring buffer, and locus data is held in one packet. The storage means is not limited to this particular type, and it may be accomplished by a memory having the function of an ordinary RAM. As long as the collecting time Ti, the elapsed time Δti and the traffic jam index Ji can be associated with the longitude/latitude data stored at the same collecting timing, these pieces of data need not be stored in the same packet.

As described above, according to the present invention, since locus data is collected on the basis of information of the vehicle location when a predetermined time has elapsed after covering a predetermined distance or longer from the previous locus data collecting position and time, collecting insignificant locus data can be avoided and only valid locus data can be selectively collected, thus requiring a smaller memory capacity.

According to the present invention, since locus data is collected on the basis of information of the vehicle location when the vehicle drives a predetermined distance after passage of a predetermined time or longer from the previous locus data collecting position and time, thus ensuring reduction of the memory capacity as per the above case.

Moreover, in the present invention, as the elapsed time from the previous locus data collecting time to the current one or the traffic jam index is stored together with locus data, it is possible to easily compute the traveling time in an arbitrary interval on the running locus.

In addition, because the current time for collecting the locus data is stored together with locus data in the present invention, it is also possible to easily acquire the vehicle location at an arbitrary time as well as the traveling time in an arbitrary interval on the running locus.

What is claimed is:

1. An on-vehicle navigation apparatus for a vehicle comprising:
vehicle location information generating means for generating information of location of said vehicle;
time information generating means for generating time information;
travel distance computing means for computing a travel distance from a previous locus data collecting position on the basis of said information of location of said vehicle and said travel locus data;
elapsed time computing means for computing an elapsed time from previous locus data collecting time on the basis of the time information and the collecting time data;
collection instructing means for generating a collection command when the elapsed time reaches a predetermined time after the travel distance has reached a predetermined distance; and
storage means for storing said information of location of said vehicle as locus data and said time information as collecting time data in response to the collection command.

2. An on-vehicle navigation apparatus for a vehicle comprising:
vehicle location information generating means for generating information of location of said vehicle;
time information generating means for generating time information;
travel distance computing means for computing a travel distance from a previous locus data collecting position on the basis of the vehicle location information and the locus data;
elapsed time computing means for computing an elapsed time from previous locus data collecting time on the basis of the time information and the collecting time data;
collection instructing means for generating a collection command when the travel distance reaches a predetermined distance after the elapsed time has reaches a predetermined time; and
storage means for storing said information of location of said vehicle as locus data and the time information as collecting time data in response to the collection command.

3. An on-vehicle navigation apparatus for a vehicle comprising:
vehicle location information generating means for generating information of location of said vehicle;
time information generating means for generating time information;
travel distance computing means for computing a travel distance from a previous locus data collecting position on the basis of the vehicle location information and the locus data;
elapsed time computing means for computing an elapsed time from previous locus data collecting time on the basis of the time information and the collecting time data;
collection instructing means for generating a collection command when the elapsed time reaches a predetermined time after the travel distance has reached a predetermined distance; and
storage means for storing the vehicle location information as locus data and said time information as collecting time data in response to the collection command, wherein said storage means stores said collecting time data or said elapsed time as a time the collection command has been generated, in association with the locus data.

4. An on-vehicle navigation apparatus according to claim 3, wherein a traveling time on a locus of the vehicle is computed on the basis of the collecting time data, or the elapsed time or the traffic jam index.

5. An on-vehicle navigation apparatus for a vehicle comprising:
vehicle location information generating means for generating information of location of said vehicle;
time information generating means for generating time information;
travel distance computing means for computing a travel distance from a previous locus data collecting position on the basis of the vehicle location information and the locus data;
elapsed time computing means for computing an elapsed time from previous locus data collecting time on the basis of the time information and the collecting time data;

collection instructing means for generating a collection command when the travel distance reaches a predetermined distance after the elapsed time has reached a predetermined time;

storage means for storing the vehicle location information as locus data and the time information as collecting time data in response to the collection command; and means for increasing a traffic jam index when the travel distance does not reach the predetermined distance after the elapsed time has reached the predetermined time, wherein said storage means stores said collecitng time data said traffic jam index in association with the locus data, wherein the traffic jam index is time information from a point of time when the predetermined time has elapsed after generation of the collection command for one piece of locus data until a point of time when the collection command is generated for next locus data.

6. An on-vehicle navigation apparatus according to claim 5, wherein a traveling time on a locus of the vehicle is computed on the basis of the collecting time data, or the elapsed time or the traffic jam index.

* * * * *